US012148082B2

(12) United States Patent
Song et al.

(10) Patent No.: US 12,148,082 B2
(45) Date of Patent: Nov. 19, 2024

(54) SYSTEM AND METHOD FOR ANIMATING AN AVATAR IN A VIRTUAL WORLD

(71) Applicant: The Education University of Hong Kong, Hong Kong (CN)

(72) Inventors: Yanjie Song, Hong Kong (CN); Leung Ho Philip Yu, Hong Kong (CN); Chi Kin John Lee, Hong Kong (CN); Kaiyi Wu, Hong Kong (CN); Jiaxin Cao, Hong Kong (CN)

(73) Assignee: The Education University of Hong Kong, Hong Kong (CN)

( * ) Notice: Subject to any disclaimer, the term of this patent is extended or adjusted under 35 U.S.C. 154(b) by 0 days.

(21) Appl. No.: 17/893,505

(22) Filed: Aug. 23, 2022

(65) Prior Publication Data

US 2023/0410398 A1    Dec. 21, 2023

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/246* (2017.01); *G06V 40/176* (2022.01); *G06V 40/23* (2022.01); *G06V 40/28* (2022.01)

(58) Field of Classification Search
None
See application file for complete search history.

(56) References Cited

U.S. PATENT DOCUMENTS 6,191,798 B1 * 2/2001 Handelman ............. G06T 13/40
345/475
6,535,215 B1 * 3/2003 DeWitt .................... G06T 13/40
345/473
(Continued)

FOREIGN PATENT DOCUMENTS

CN        102934144 A       2/2013
CN        105190700 A      12/2015
(Continued)

OTHER PUBLICATIONS

Koray Balci; "Xface: MPEG4 Based Open Source Toolkit for 3D Facial;" ACM; AVI '04, May 25-28, 2004, Gallipoli (LE), Italy (Year: 2004).*
(Continued)

*Primary Examiner* — Edward Martello
(74) *Attorney, Agent, or Firm* — MOSER TABOADA

(57) ABSTRACT

A system and method for animating an avatar in a virtual world comprising an image processor arranged to process a stream of images capturing an active user to obtain an activity data set arranged to track the activity of the user; an avatar spatial processor arranged to process the activity data set to determine a plurality of motion tracking points arranged to track the user's activity over a three-dimensional space; a facial expression detection engine arranged to process the activity data set to detect one or more facial expressions of the user; and, an avatar animation engine arranged to animate the avatar in the virtual world with the plurality of motion tracking points and the detected one or more facial expressions so as to mirror the actions and facial expressions of the active user.

12 Claims, 6 Drawing Sheets

(51) Int. Cl.
*G06V 40/16* (2022.01)
*G06V 40/20* (2022.01)

(56) References Cited

U.S. PATENT DOCUMENTS

| | | | |
|---|---|---|---|
| 7,403,202 B1* | 7/2008 | Nash | G06T 7/246 |
| | | | 345/474 |
| 9,142,034 B2* | 9/2015 | Hoof | A63F 13/428 |
| 9,165,404 B2 | 10/2015 | Han et al. | |
| 9,177,409 B2* | 11/2015 | Rennuit | G06T 13/40 |
| 11,600,013 B2* | 3/2023 | Ciuc | G06V 40/165 |
| 2010/0197391 A1* | 8/2010 | Geiss | G06V 40/103 |
| | | | 463/31 |
| 2012/0056800 A1* | 3/2012 | Williams | G06V 40/103 |
| | | | 345/156 |
| 2012/0162065 A1* | 6/2012 | Tossell | G06V 40/23 |
| | | | 345/156 |
| 2013/0243255 A1* | 9/2013 | Williams | A63F 13/428 |
| | | | 382/103 |
| 2015/0036879 A1* | 2/2015 | Shiozaki | G06T 7/73 |
| | | | 382/103 |
| 2016/0042548 A1* | 2/2016 | Du | G06T 13/40 |
| | | | 345/473 |
| 2021/0074004 A1* | 3/2021 | Wang | G06T 13/40 |

FOREIGN PATENT DOCUMENTS

| | | |
|---|---|---|
| CN | 106104633 A | 11/2016 |
| CN | 106415665 A | 2/2017 |
| CN | 107004287 A | 8/2017 |

OTHER PUBLICATIONS

Huang et al., "3D Face Reconstruction based on Improved CANDIDE-3 model;" 2012 Fourth International Conference on Digital Home; IEEE Computer Society (Year: 2012).*

Fragkiadaki et al.; "Recurrent Network Models for Human Dynamics;" 2015 IEEE International Conference on Computer Vision (ICCV) (Year: 2015).*

Zhang et al.; "Dynamic facial expression analysis and synthesis with MPEG-4 facial animation parameters;" IEEE Transactions on circuits and systems for video technology, 18(10), pp. 1383-1396 (Year: 2008).*

* cited by examiner

SYSTEM AND METHOD FOR ANIMATING AN AVATAR IN A VIRTUAL WORLD

CROSS-REFERENCE TO RELATED APPLICATIONS

The application claims the benefit of Hong Kong Patent Application HK 32022055477.0 filed on Jun. 20, 2022, which is herein incorporated by reference in its entirety.

TECHNICAL FIELD

The present invention relates to a system and method for animating an avatar in a virtual world, and particularly, although not exclusively, to a system and method for animating an avatar using a video stream.

BACKGROUND

Due to the advances and accessibility in communications and computer technologies, more users are able to access virtual environments for entertainment, education, socialising and work. In more recent times, virtual environments, where users are able to interact with each other online within a computer-based platform, have become more immersive and functional.

These virtual environments may include multiple platforms which allow a graphical representation of a virtual world whereby users can enter and roam around the virtual environment as an open world. They may also manipulate objects or interact with other users within this open world. However, to interact with other users or to manipulate objects within the virtual world, the user may require the use of specific virtual reality or virtual environment devices. These may include headsets or handheld controllers. However, such devices may be cumbersome, expensive, and when used for prolonged periods of time, these devices may even adversely affect the user in the form of discomfort or strain.

SUMMARY OF THE INVENTION

In accordance with a first aspect of the present invention, there is provided a system for animating an avatar in a virtual world comprising:
  an image processor arranged to process a stream of images capturing an active user to obtain an activity data set arranged to track the activity of the user;
  an avatar spatial processor arranged to process the activity data set to determine a plurality of motion tracking points arranged to track the user's activity over a three-dimensional space;
  a facial expression detection engine arranged to process the activity data set to detect one or more facial expressions of the user; and,
  an avatar animation engine arranged to animate the avatar in the virtual world with the plurality of motion tracking points and the detected one or more facial expressions so as to mirror the actions and facial expressions of the active user.

In an embodiment of the first aspect, the avatar spatial processor is arranged to:
  identify one or more portions of the user, including head, arms, torso, legs or any one or combination thereof from the stream of images;
  place tracking points on the identified one or more portions of the user; and,
  track the movement of the tracking points over the stream of images.

In an embodiment of the first aspect, the tracking points are:
  mapped onto an avatar skeleton arranged to represent a physical structure of the avatar; and,
  aligned with the one or more joints of the virtual avatar skeleton.

In an embodiment of the first aspect, the avatar spatial processor is further arranged to estimate missing skeleton portions between the identified one or more portions of the avatar skeleton.

In an embodiment of the first aspect, the image processor includes a pose tracking model arranged to track a pose of the user from the stream of images.

In an embodiment of the first aspect, the image processor further includes a hand tracking model arranged to track a hand or finger gesture of the user from the stream of images.

In an embodiment of the first aspect, the image processor further includes a facial expression detection model arranged to detect one or more facial expression of the user from the stream of images.

In an embodiment of the first aspect, the avatar animation engine includes a physics engine arranged to apply an inverse kinematics function onto the plurality of motion tracking points.

In an embodiment of the first aspect, the avatar animation engine further includes an anti-clipping engine arranged to apply a collider around the avatar to avoid clipping of the avatar when animated in the virtual world.

In an embodiment of the first aspect, the anti-clipping engine is further arranged to include a spring joint function arranged to apply a colliding and opposing force on the plurality of motion tracking points.

In accordance with a second aspect of the present invention, there is provided a method for animating an avatar in a virtual world comprising the steps of:
  processing a stream of images capturing an active user to obtain an activity data set arranged to track the activity of the user;
  processing the activity data set to determine a plurality of motion tracking points arranged to track the user's activity over a three-dimensional space;
  processing the activity data set to detect one or more facial expressions of the user; and,
  animating the avatar in the virtual world with the plurality of motion tracking points and the detected one or more facial expressions so as to mirror the actions and facial expressions of the active user.

In an embodiment of the second aspect, the step of processing the activity date includes:
  identify one or more portions of the user, including head, arms, torso, legs or any one or combination thereof from the stream of images;
  place tracking points on the identified one or more portions of the user; and,
  track the movement of the tracking points over the stream of images.

In an embodiment of the second aspect, the tracking points are:
  mapped onto an avatar skeleton arranged to represent a physical structure of the avatar; and,
  aligned with the one or more joints of the virtual avatar skeleton.

In an embodiment of the second aspect, the step of processing the activity data is further arranged to estimate missing skeleton portions between the identified one or more portions of the avatar skeleton.

In an embodiment of the second aspect, the step of processing the activity date includes using a pose tracking model arranged to track a pose of the user from the stream of images.

In an embodiment of the second aspect, the step of processing the activity date includes using a hand tracking model arranged to track a hand or finger gesture of the user from the stream of images.

In an embodiment of the second aspect, the step of processing the activity date includes using a facial expression detection model arranged to detect one or more facial expression of the user from the stream of images.

In an embodiment of the second aspect, the step of animating the avatar includes using a physics engine arranged to apply an inverse kinematics function onto the plurality of motion tracking points.

In an embodiment of the second aspect, the step of animating the avatar further includes using an anti-clipping engine arranged to apply a collider around the avatar to avoid clipping of the avatar when animated in the virtual world.

In an embodiment of the second aspect, the anti-clipping engine is further arranged to include a spring joint function arranged to apply a colliding and opposing force on the plurality of motion tracking points.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
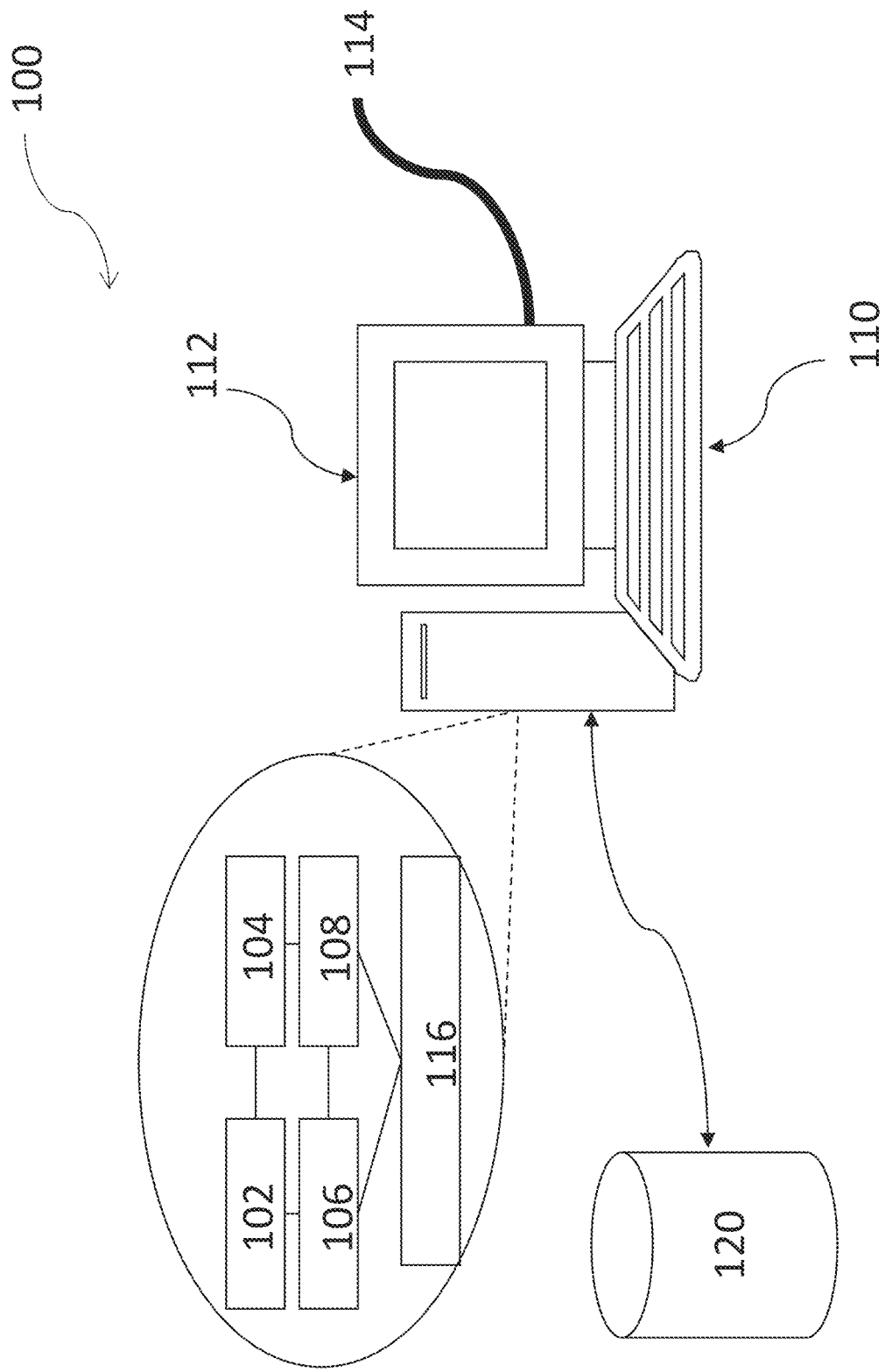
FIG. 1 is a schematic block diagram of a computer system which may be implemented to operate as one embodiment of the system for animating an avatar in a virtual world.

Referring to FIG. 1, an embodiment of a computer system which may be implemented with software, hardware or a combination of both to provide an example of a system and method for animating an avatar in a virtual world is presented.

In this example embodiment, the interface, processor and engine of the system for animating an avatar in a virtual world are implemented by a computer having an appropriate user interface. The computer may be implemented by any computing architecture, including portable computers, tablet computers, stand-alone Personal Computers (PCs), smart devices, Internet of Things (IOT) devices, edge computing devices, client/server architecture, "dumb" terminal/mainframe architecture, cloud-computing based architecture, or any other appropriate architecture. The computing device may be appropriately programmed to implement the invention.

In this present embodiment, the system for animating an avatar in a virtual world may be implemented to comprise:
- an image processor arranged to process a stream of images capturing an active user to obtain an activity data set arranged to track the activity of the user;
- an avatar spatial processor arranged to process the activity data set to determine a plurality of motion tracking points arranged to track the user's activity over a three-dimensional space;
- a facial expression detection engine arranged to process the activity data set to detect one or more facial expressions of the user; and,
- an avatar rendering engine arranged to render the avatar in the virtual world with the plurality of motion tracking points and the detected one or more facial expressions so as to mirror the actions and facial expressions of the active user.

In this example embodiment, the system for animating an avatar in a virtual world is arranged to receive a video stream, or a stream of images, from an image source such as a camera, which is arranged or have been arranged, to capture a video of a user who may be undertaking various activities intended for their respective avatar within a virtual world. These activities may include any type of activities whereby a user may move any limb or parts of their body, including talking, presenting, singing, dancing, or moving as part of a social interaction, presentation, performance, manipulation of objects or any other activity where there is movement of the user's limbs or various body parts as well as their facial features for the expression of their facial expressions or emotions.

Once the video stream is captured of the user undertaking such activities, the video stream may be transmitted to the system for animating an avatar in a virtual world via a communication network such as the internet. When the video stream is received by the system for animating an avatar in a virtual world, the system may proceed to process the video stream by analysing for specific objects or limbs within the frames of the video so as to identify any specific user activity, expressions or movements. This may include, for example, the pose of the user, hand position or gestures of the user, facial expressions of the user, or other types of body language of the user that may be desired or necessary for replication on the avatar within the virtual world.

Once these user activity, expressions or movements are identified and tracked over a period of time (e.g., over a number of frames of the video), a set of activity points, which are associated with the limbs or body parts of the user can be devised to mirror the pose, hand position or facial expression of the user. These activity points may then be used to animate the movement of an avatar which would have been pre-selected by the user for the specific virtual world. To animate the avatar within the virtual world, the system may transmit the activity points to an avatar generating, animating or rendering engine which would move the limbs or parts of the avatar corresponding to the activity points and thus allowing the avatar to mirror the pose of the user, the hand gestures of the user as well as the facial expression of the user.

Preferably, the system for animating an avatar in a virtual world further include a physics engine arranged to further process the plurality of motion tracking points to improve the mirroring of physical characteristics of the user's activity. Additionally, it may also be optional to further include an anti-clipping engine arranged to prevent clipping in the rendering of the avatar in the virtual world.

Embodiments of the system for animating an avatar in a virtual world may be advantageous as an avatar may be animated within a virtual world by processing a video stream only. By using a video stream and processing the video stream to obtain a set of activity points relevant to the movement of the user's limbs, facial expressions and body parts, the user is not required to purchase and use specific equipment for interacting within a virtual world. In turn, reducing the cost for the user as well as the risk of injury or discomfort with wearing such devices.

As it would be appreciated by a person skilled in the art, the term "virtual world" includes any type of computer-based platform environment, online environments or open worlds where users may access and interact with other users, messages, multimedia content or virtual objects. This may include open worlds which are in three dimensions that are sometimes referred to as "Metaverse" and may be provided by open world platforms such as "Sandbox" or "Decentraland", or gaming open worlds such as those provided by the gaming platform "Fortnite", or any other virtual reality, virtual environment or virtual worlds. It should also be noted that the term virtual world does not have to be a three-dimensional world but may include two dimensional worlds or maps, or indeed a bulletin board, communication platform, teleconferencing system, message exchange or any type of computer or online environment.

As shown in FIG. 1, there is a shown a schematic diagram of a computer system or computer server 100 which is arranged to be implemented as an example embodiment of a system for animating an avatar in a virtual world. In this embodiment, the computer system is a server 100 which includes suitable components necessary to receive, store and execute appropriate computer instructions. The components may include a processing unit 102, including Central Processing Unit (CPUs), Math Co-Processing Unit (Math Processor), Graphic Processing Unit (GPUs) or Tensor processing unit (TPUs) for tensor or multi-dimensional array calculations or manipulation operations, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 may include instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices, Internet of Things (IoT) devices, smart devices, edge computing devices. At least one of a plurality of communications link may be connected to an external computing network through a telephone line or other type of communications link.

The server 100 may include storage devices such as a disk drive 108 which may encompass solid state drives, hard disk drives, optical drives, magnetic tape drives or remote or cloud-based storage devices. The server 100 may use a single disk drive or multiple disk drives, or a remote storage service. The server 100 may also have a suitable operating system 116 which resides on the disk drive or in the ROM of the server 100.

The computer or computing apparatus may also provide the necessary computational capabilities to operate or to interface with a machine learning network, such as a neural networks, to provide various functions and outputs. The neural network may be implemented locally, or it may also be accessible or partially accessible via a server or cloud-based service. The machine learning network may also be untrained, partially trained or fully trained, and/or may also be retrained, adapted or updated over time.

Figure 2:
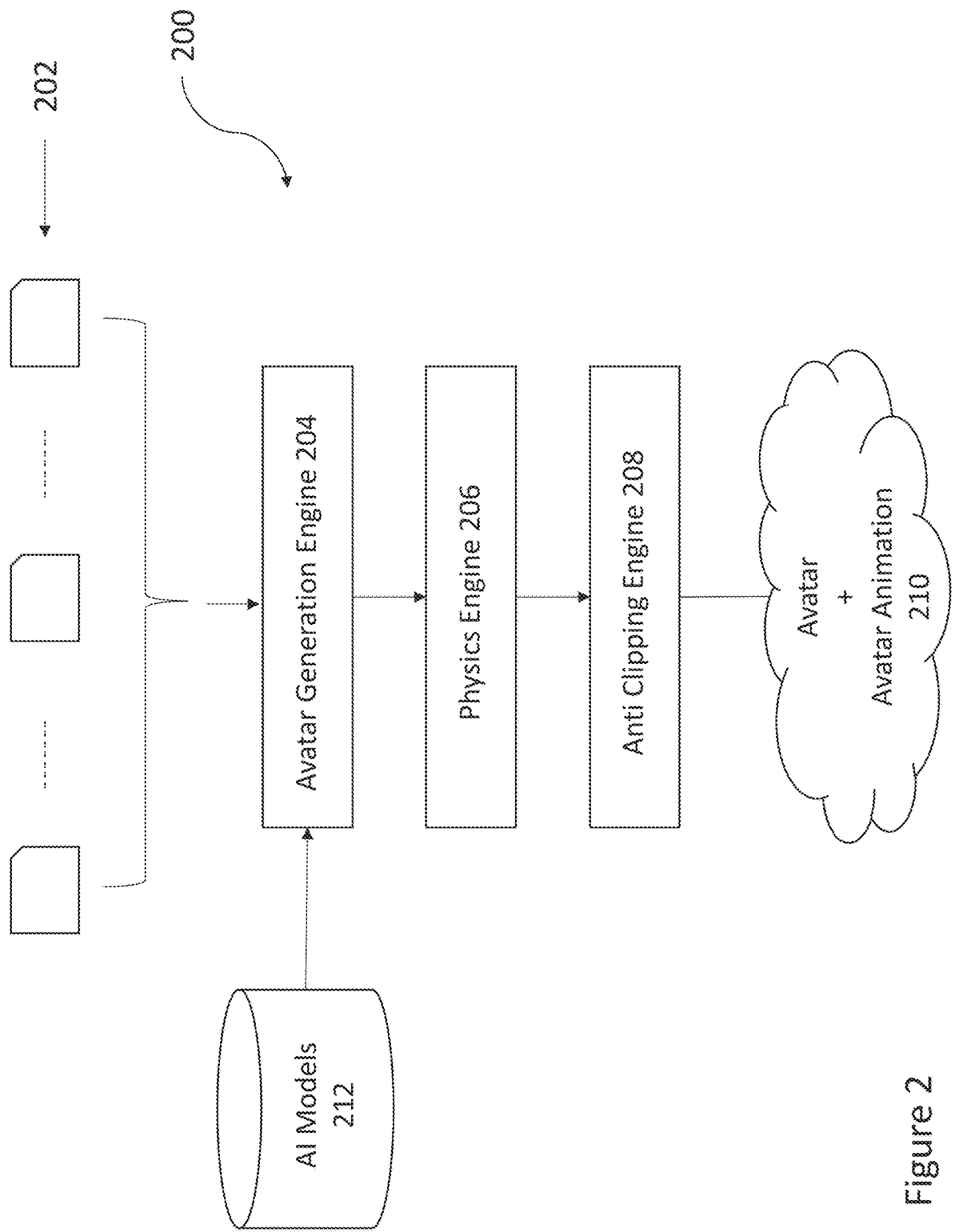
FIG. 2 is a block diagram of an embodiment of the system for animating an avatar in a virtual world.

With reference to FIG. 2, there is illustrated a block diagram of a system for animating an avatar in a virtual world 200. In this embodiment, the system includes an avatar generation engine 204, physics engine 206 and anti-clipping engine 208 which together is arranged to process a stream of images 202 of a user in action or performing a specific activity and in turn creating and animating an avatar for the user in a virtual environment such as a virtual world 210, virtual reality environment, virtual environment, open world or online platform which may also be referred to as the "metaverse".

In this embodiment, a user may firstly begin the avatar animation process by presenting themselves in front of a camera such as a web cam and proceeding to recording a video or stream of images 202 of the user undertaking any specific type of activity. Such activity may include, without limitations, the user moving their heads or limbs including their fingers as it would be expected of a user in interacting with another person or conversing with another person with voice, facial expressions, and gestures reflect of an overall body language. This video stream 202 may then be transmitted to the system for animating an avatar in a virtual world 200 via a telecommunications link such as the Internet or any type of communication network and when upon the system for animating an avatar in a virtual world 200 will receive the stream of images 202, the stream of images may then be processed to generate and animate the avatar in the virtual world.

In this embodiment, the system for animating an avatar in a virtual world 200 may firstly process the stream of images 202 as received from the user with the avatar generation engine 204. In this example, the avatar generation engine 204 uses an image processor to track a pose of the user, the hand gestures of the user and the facial expression of the user. This is performed by using individual Artificial Intelligent (AI) models 212 which are individually arranged to process the images to identify a specific pose (pose estimation models), a hand or finger gesture or the facial expressions of the user. In this process, each of the AI models 212 are arranged to identify specific points relevant to what it is intended to be tracking and this may be performed by a trained neural network, such as Convolution Neural Networks (CNN) arranged to identify specific limbs or body portions from the images and tracking each of these limbs or body portions as they are presented in the image stream 202 and with these identifications and tracking, track specific points of these limbs and body parts to construct a skeleton of the moving person in the images so as to in turn determine the pose, gesture or facial expression of the moving person.

Preferably, to improve the quality of the animation of the output avatar, the output of image processor is further processed by an avatar spatial processor which is arranged to infer points relevant to joints of a skeleton of a user and to further reformat these joints onto the skeleton. Furthermore, in some example embodiments, the avatar spatial processor may also generate and insert missing data which may not have been sufficiently identified by the AI models 212 used by the image processor. In turn this process may see that additional points can be provided so as to animate the avatar in a three-dimensional perspective. The functions of the image processor and its respective AI models and the avatar spatial processor is further described in detail with respect to FIG. 3 below.

Preferably, the image processor may also proceed to identify the facial expression of the user from the stream of images by using a facial expression detection model to track the facial features of the user by looking at positions of the mouth, eyes and nose. In turn, once an expression of the user is identified, this expression may then be used to animate an avatar in the virtual world so as to mirror the facial expression of the avatar and that of the user.

Once the avatar generation engine 204 is able to apply various AI models 212 to track specific points of a user moving their various body parts or their facial expressions in a three-dimensional space, an avatar would then be generated and may be rendered within a virtual world 210 with the movements of the user as captured in the stream of images 202 continuously updating the avatar and thus allowing the avatar to be animated in the virtual world 210.

As shown in this example embodiment, in order to further improve the animation of the avatar in the virtual world 210 the system further includes an optional physics engine 206 arranged to improve the animation of the motions of the generated avatars. This is advantageous as it may allow the avatars to appear in the virtual world to move about more smoothly and in a more natural manner. In order to provide this function, the physics engine 206 may use Inverse Kinematics (IK) function to target seven body portions, including the body, left arm, right arm, left leg, right leg, left-hand fingers and right-hand fingers. By ensuring these seven points are considered in the use of an IK function, the physics engine 206 may be able to animate the movement of these seven body portions in a more lifelike and physically appropriate movements.

As shown in this example embodiment, the system may also include optional anti-clipping engine 208 arranged to improve the animation of the avatar in the virtual world. Within the virtual world, it is possible for avatars to interact with each other, including the possibility that avatars may make contact or be in close proximity with other avatars during an interaction or exchange. This may result in the form of physical contact gestures, such as handshakes or first bumping as well as hugs and wrapping an avatar's arms around the shoulders of another avatar. Accordingly, an anti-clipping engine 208 which sets colliders around each of the avatars may be included such that the avatars may not "clip" each other when two or more avatars are in proximity or in contact with each other. This may be implemented by setting colliders within the animation of the avatar so as to avoid clipping. Preferably, the colliders may be implemented by including a solid range which will not be able to be crossed through by the avatars. Spring joints may also be implemented such that when a force is received by objects or other avatars, clipping may also be avoided with a possible animation of an opposing force between the avatars and the item or object in which there is contact. As an example, when avatars give high-fives and hugs, the colliders would prevent clipping between the avatars as the avatar bodies are set with their respective colliders. The limbs of the avatars may also be animated to respond to the contact force with an opposite force effect via the implementation of the spring joints effect on limbs of the avatars. The overall process will therefore improve the animation of the avatar within the virtual world as it would make the avatar more lifelike and obeying the laws of physics.

Once the avatar is animated within the virtual world 210, a user may then enter the virtual world by the use of their camera alone without the necessity to utilise other equipment provided that the camera is able to capture the user or at least portions of the user. By processing the stream of images 202, the system for animating an avatar in a virtual world 200 may place an avatar within the virtual world to mirror the movements or activities as well as the facial expressions of the user. This is particularly advantageous in an education setting where the movement of a user's limb, including their hand or finger gestures is particularly helpful to communicate with other users and therefore by implementing embodiments of the present system, an avatar may be animated for activities such as education, counselling, discussion or interaction sessions between different avatars without the need to use specific equipment or sensors placed on the limbs of a user.

Figure 3:
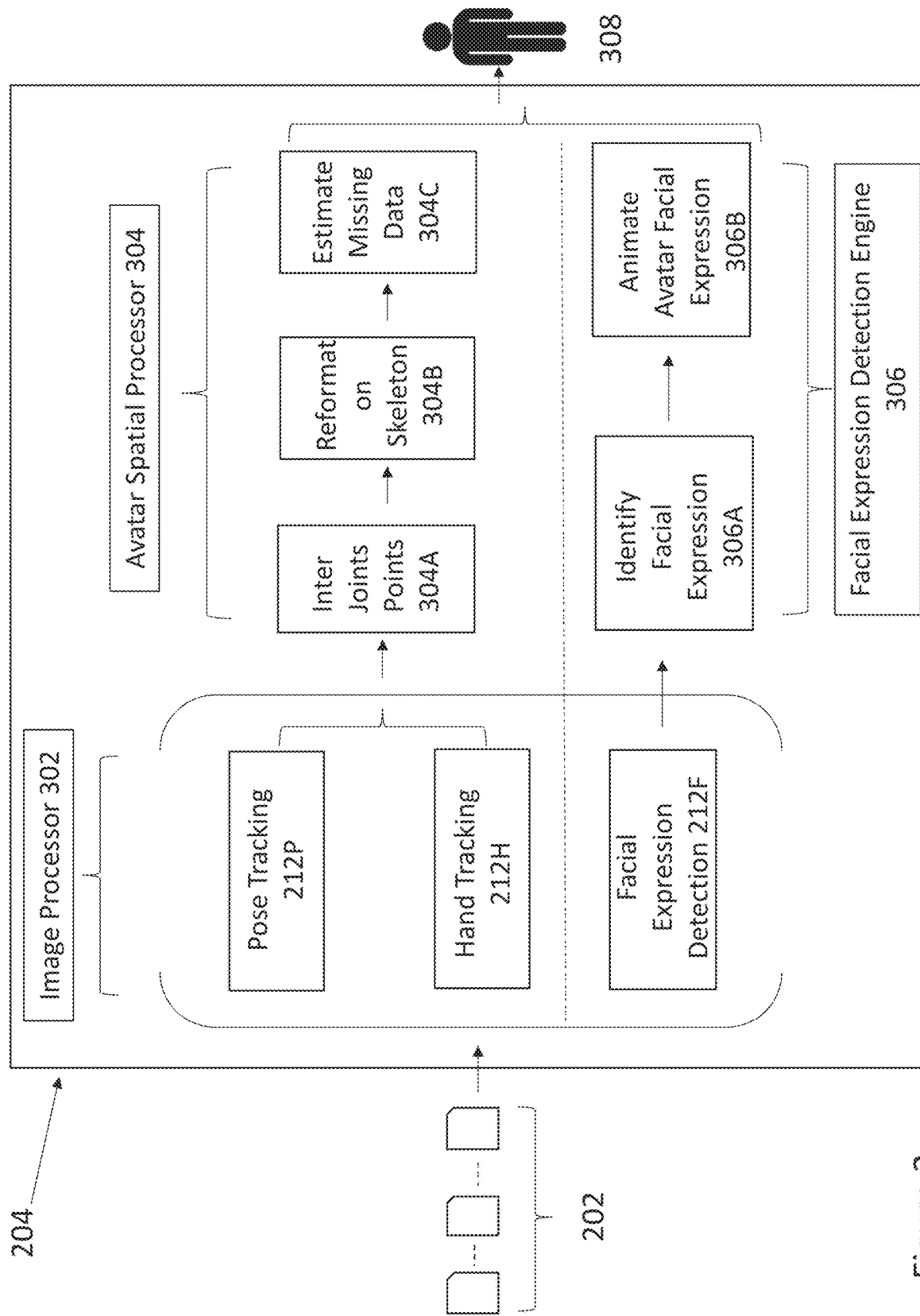
FIG. 3 is a block diagram of an embodiment of the avatar generation engine of the system for animating an avatar in a virtual world of FIG. 2.

With reference to FIG. 3, there is illustrated a block diagram of an example embodiment of an avatar generation engine 204. In this embodiment, the avatar generation engine 204 is arranged to process a stream of images 202 and produce or generate an avatar in a virtual world. The avatar generation engine 204 includes an image processor 302 which is arranged to process the stream of images 202 with various AI models 212P, 212H, 212F that are each arranged to individually process each of the images in the stream of images 202 to identify specific body parts or objects in the images. In turn, once these parts or objects are identified over a series of image frames, specific tracker points are placed onto these objects or body parts such that they can be tracked. Examples of such AI models may include a pose tracking 212P or pose estimation model which is arranged to track the pose of a user as captured in the image stream 202 by use of a trained neural network arranged to process the images to identify specific objects of interests (e.g. user's limbs or body parts) and track these over various frames so as to build a skeleton of the user as based on the detected limbs or body parts. Alternatively, a hand or finger gesture tracking model 212H may be arranged to track the hand or finger positions of the user as well so as to identify specific gestures as presented by the hands or fingers.

Preferably, another model that may be used include a facial expression detection model 212F which is arranged to identify facial expression as expressed by the user. These models 212P, 212H, 212F may be implemented by various image processing systems although preferably they are implemented by trained neural networks such as convolution neural networks (CNN) that have been trained to identify specific objects or body parts and track these over the stream of images. By using each of these individual models 212P, 212H, 212F or any other model as desired, the image processor 302 would therefore be able to track a plurality of points to the objects or body parts which are to be tracked including the pose of the user, the hand or finger gestures of the user as well as the facial expression of the user. Each of these models will produce a plurality of points which may then be followed to identify the movements of the user over a stream of images 202 and in turn such points may then be used to animate an avatar so as to mirror the movement of the avatar in the virtual world to that of the user in real life.

In this embodiment, in order to improve the quality of the animation once the tracking points have been identified by the image processor 302, an avatar spatial processor 304 is used to process each of these points so as to provide a superior tracking of the user activity or gesture over a three-dimensional space. According to the trials and research as performed by the inventors, in order to create a three-dimensional dynamic avatar, it is required that there are additional input data relating to the user before a three-dimensional avatar may be animated. This data may include the preference to match numbers or position of joints on the avatar skeleton and to produce parameters to control the avatar movements. As well as the ability identify specific emotions behind a facial expression clearly through direct tracking.

Accordingly, in this embodiment, the avatar generation engine 204 is arranged to enable the capacity of performing a real-time, comprehensive and complete generation of avatars by integrating multiple AI models 212P, 212H, 212F to mirror a real user on an avatar. The engine 204 includes the following processes:

(a) The engine may recalculate the extracted outputs of the image processor and its AI models to align with the avatar joints 304A. For example, the pose tracking AI model 212P may output 18 tracking points based on webcam video stream, but an avatar may require 22 joints for it to be built up. In turn, the engine may infer the missing joints to satisfy the requirement.

(b) The engine may reformat the tracking points of AI models to match the skeletons of the avatar 304B. For example, the engine may convert the coordinate of position produced in some AI models from 4-dimensional to a 3-dimensional matrix, which is available to be an avatar's joint.

(c) The engine may make reasonable estimates for missing data to fulfil the animation requirement of an avatar 304C. For example, real-time coordinates of neck positions may be useful for animating an avatar. However, examples of pose tracking models may not produce the coordinates of neck positions directly. The engine may then calculate them by the coordinates of the two shoulders' positions.

(d) The engine may also recognise and categorise facial expressions of real users to make the avatars' facial expressions appear more natural. Accordingly, once a facial expression is detected 306A, the avatar may be animated to match the detected facial expression 306B, and thus the facial expression of the avatar may be animated to a greater effect then the user's facial expression so as to make the facial expression more obvious within the virtual world.

Figure 4:
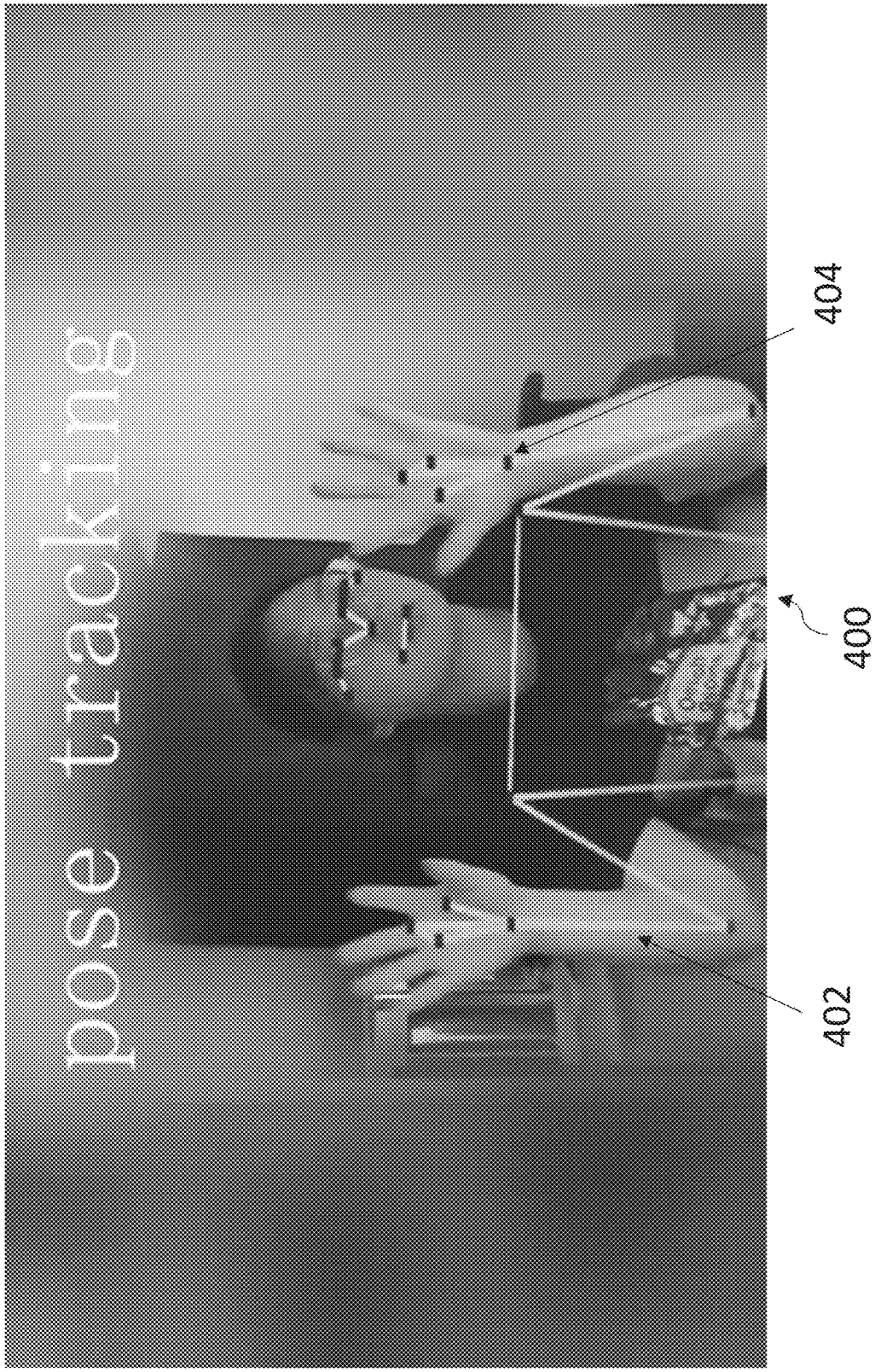
FIG. 4 is an animation screenshot of an operation of a pose tracking model of the embodiment of the avatar generation engine of FIG. 3.

Once the avatar spatial processor 304 and the facial expression detection engine 306 provides this additional activity tracking information, the tracking information is then used and animate the avatar in the virtual world. As illustrated earlier in FIG. 2, the avatar may be further improved in its animation with the optional use of a physics engine 206 and an anti-clipping engine 208 where necessary or desirable such as in an education setting where there may be close interactions between individual avatars With reference to FIG. 4, there is illustrated an example screenshot output of how the image processor 302 and the avatar spatial processor 304 operates so as to track the pose of a user. As illustrated within the user image, there is shown a user 400 who is showing her hands and head and torso. The image processor 302, by use of an pose estimation model 212P is able to identify her hands arms body and head as well as her facial features. In this process, individual points 404 as shown are plotted along the users body parts and a skeleton 402 is then form of the user. These points 404 and skeleton 402 may then be improved further by further processing with the avatar spatial processor arranged to infer further points onto the skeleton and reformat these points onto the skeleton. Additional missing data such as the neck portion that may not be readily identify by the image processor may then also be inserted into the tracking process by identifying the position of the shoulders.

Figure 5:
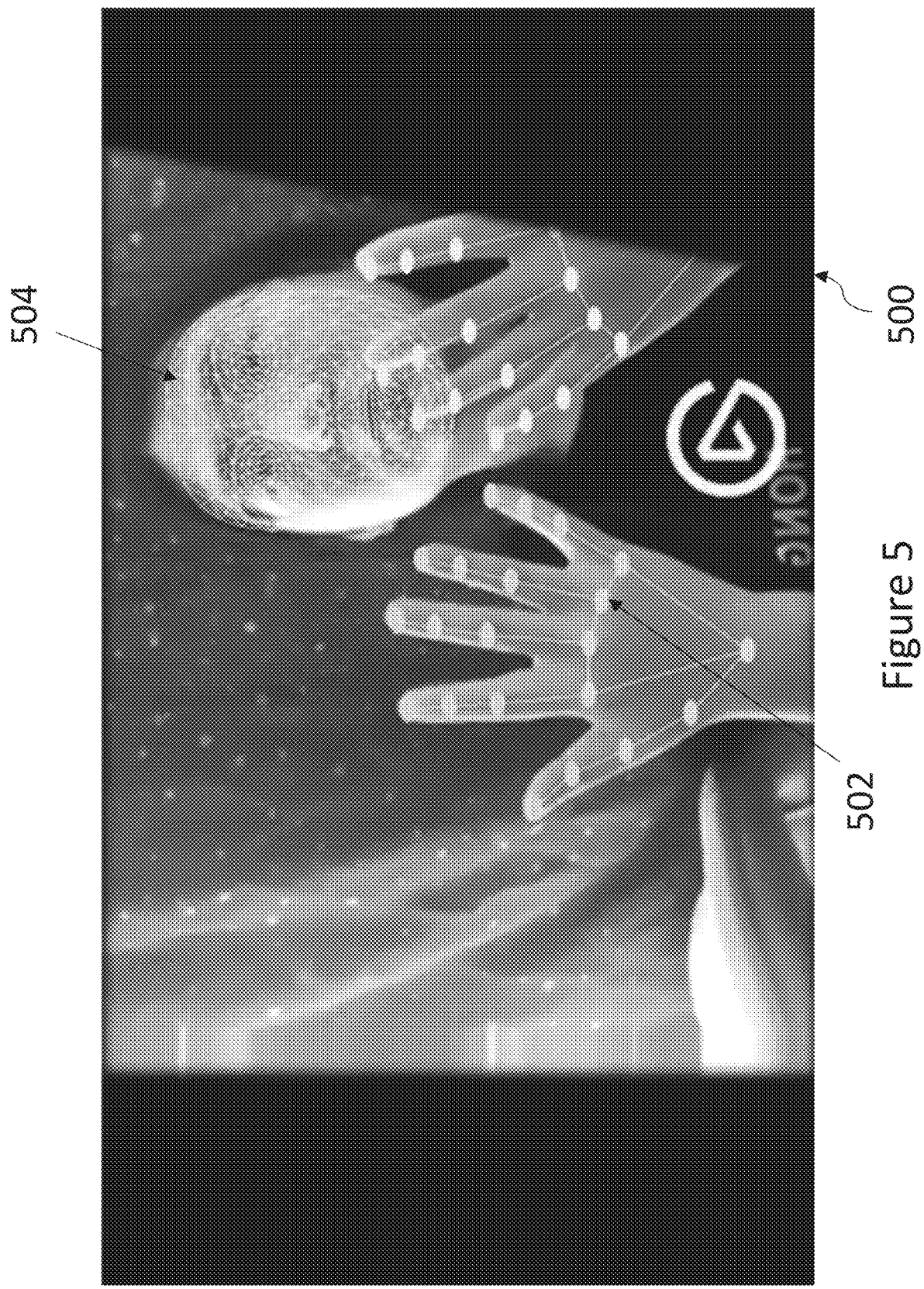
FIG. 5 is an animation screenshot illustrating an operation of a hand tracking model and facial expression recognition model of the embodiment of the avatar generation engine of FIG. 3; and, FIG. 6 is an example screenshot illustrating an avatar as animated by the system for animating an avatar in a virtual world of FIG. 2.

Similarly, with reference to FIG. 5, there is illustrated a user image showing a user's hands and her face 500. The AI models 212 as provided within the image processor is arranged to perform hand and finger gesture tracking and thus the model is able to plot and track tracking points 502 onto the hands of the user 500. The facial expression 504 is also tracked by the facial expression detecting model. These points 502, 504, which will change in position as the user 500 moves their hands, fingers or facial expressions may be tracked and used to animate the avatar.

Figure 6:
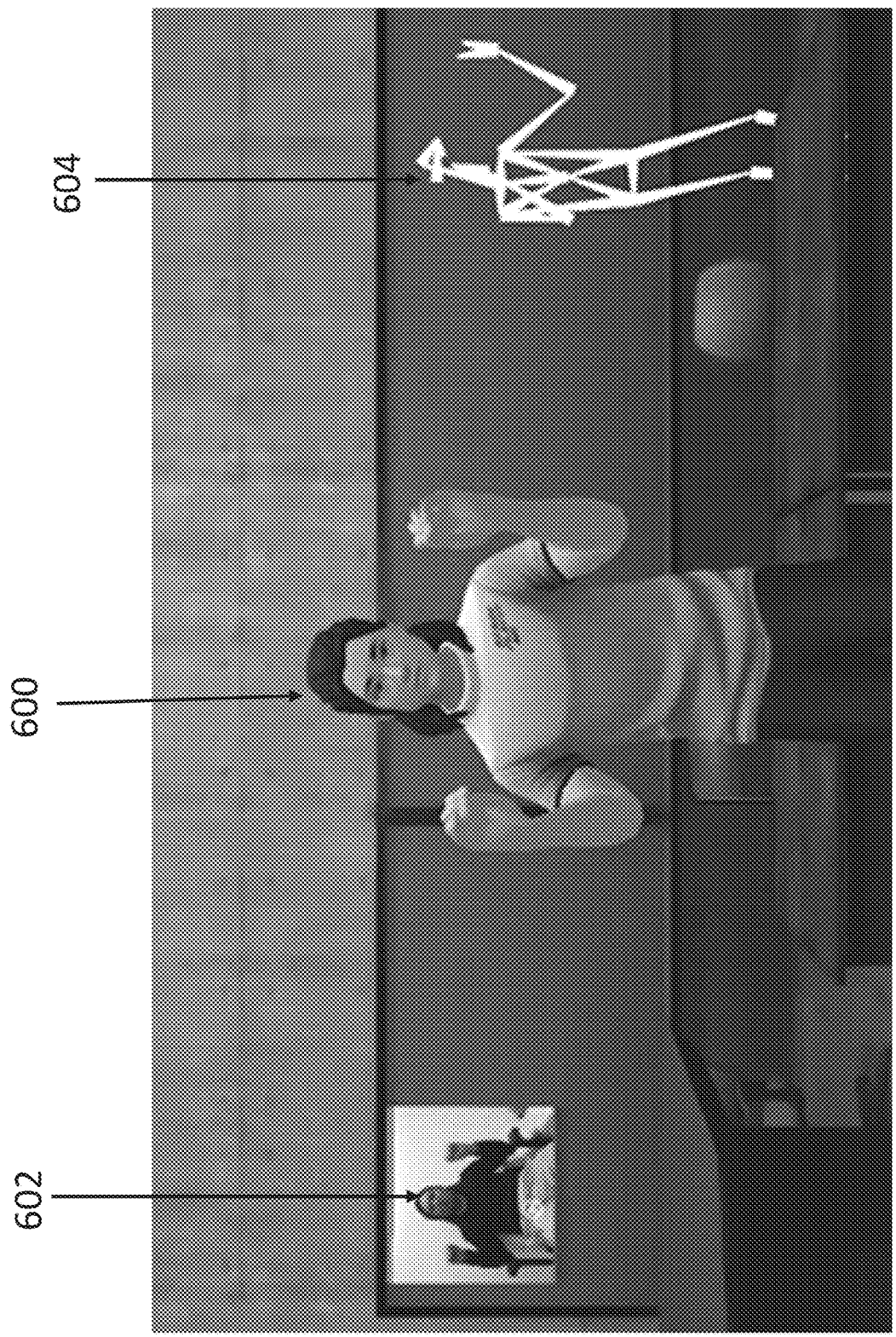

With reference to FIG. 6, there is illustrated an example of a three-dimensional avatar 600 as generated in a virtual world together with an illustration of the user image 602 and a system generated skeleton 604 of the user which would have been produced by the avatar generation engine 204. As shown in this example, the avatar 600 may be animated to mirror the exact pose and gesture of the user in the image stream 602 along with their skeleton 604 which has been generated to mirror the pose and gesture of the user. FIG. 6 illustrates an example advantage of an embodiment of the present system for generating and animating an avatar in a virtual world as the gestures of the user may be reproduce in a three-dimension avatar without the necessity of using any complex equipment or sensors but simply the processing of an image stream as captured of the user by a camera.

In some example embodiments, an AI model converter may be used to adapt the launching of multiple AI models simultaneously for edge computing devices or computers with minimal processing power. As each AI model may require a specific development framework (e.g., python, Pytorch, TensorFlow). If multiple AI models are launched simultaneously, the combination may create a new runtime environment individually. These environments will occupy system resources even if they are in idle status. It may therefore overload the CPU, GPU, and RAM on an edge computing device or a computer with minimal processing power. Accordingly, by using an AI model converter to transfer AI models developed on different frameworks to be executable in an shared platform, such as ONNX (Open Neural Network Exchange), an open-source AI ecosystem platform.

The ONNX platform would therefore provide compatibility with different AI development frameworks, enabling various models to launch on it. The ONNX acts as the "coordinator" of these AI models and distributes hardware resources dynamically (CPU, GPU and RAM) according to their specific needs and thus allowing computing devices with minimal processing power to use the AI models for processing the image streams for the generation and animation of avatars in a virtual world.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A system for real-time animating an avatar in a virtual world comprising:
    an image processor adapted to track a pose, hand gestures, and facial expression of a user from a stream of images using individual Artificial Intelligence (AI) models, wherein the AI models consist of: a pose tracking model arranged to process the images over various frames to identify specific objects of interests based on detected limbs or body parts to identify specific limbs or body portions from the images and tracking each of these limbs or body portions, and, with the identifications and tracking, track specific points of these limbs and body parts to construct a skeleton of a moving person so as to in turn determine a pose of the user; a hand or finger gesture tracking model arranged to track hand or finger positions of the user so as to identify specific gestures as presented by hands or fingers; and a facial expression detection model arranged to identify facial expression as expressed by the user;
    an avatar spatial processor arranged to carry out the steps of:
        (i) recalculating extracted outputs of the image processor and the estimation models to align with joints of the skeleton and infer missing joints;
        (ii) reformatting the specific points of estimation models to match the skeleton by converting a coordinate of position produced in estimation models from a 4-dimensional to a 3-dimensional matrix, which is available to be a joint of the avatar;
        (iii) making estimates for missing data to fulfil animation requirement; and
        (iv) recognizing and categorizing facial expressions of real users to make an avatar's facial expressions appear more natural;
    in light of additional input data comprising a preference to match numbers or position of joints on the skeleton and to produce parameters to control movements of the avatar and to identify specific emotions behind a facial expression through direct tracking;
        an avatar animation engine arranged to animate the avatar in the virtual world with the plurality of motion tracking points and the detected one or more facial expressions so as to mirror the actions and facial expressions of the active user, wherein the avatar animation engine includes a physics engine arranged to apply an inverse kinematics function onto the plurality of motion tracking points of seven body portions, including the body, left arm, right arm, left leg, right leg, left-hand fingers and right-hand fingers.

2. A system for animating an avatar in accordance with claim 1, wherein the avatar spatial processor is arranged to:
    identify one or more portions of the user, including head, arms, torso, legs or any one or combination thereof from the stream of images;
    place tracking points on the identified one or more portions of the user; and
    track the movement of the tracking points over the stream of images.

3. A system for animating an avatar in accordance with claim 2, wherein the tracking points are:
    mapped onto an avatar skeleton arranged to represent a physical structure of the avatar; and
    aligned with the one or more joints of the virtual avatar skeleton.

4. A system for animating an avatar in accordance with claim 1, wherein the image processor further includes a hand tracking model arranged to track a hand or finger gesture of the user from the stream of images.

5. A system for animating an avatar in accordance with claim 1, wherein the avatar animation engine further includes an anti-clipping engine arranged to apply a collider around the avatar to avoid clipping of the avatar when animated in the virtual world.

6. A system for animating an avatar in accordance with claim 5, wherein the anti-clipping engine is further arranged to include a spring joint function arranged to apply a colliding and opposing force on the plurality of motion tracking points.

7. A method for real-time animating an avatar in a virtual world comprising the steps of:
    processing a stream of images capturing an active user to obtain an activity data set arranged to track a pose of the user using individual Artificial Intelligence (AI) models arranged to process the images to identify specific objects of interests to identify specific limbs or body portions from the images and tracking each of these limbs or body portions estimation models, and with the identifications and tracking, to track specific points of these limbs and body parts to construct a skeleton of a moving person so as to in turn determine the pose of the user;
    in light of additional input data comprising a preference to match numbers or position of joints on the skeleton and to produce parameters to control movements: recalculating the extracted outputs of the image processor and the estimation models to align with joints of the skeleton and infer missing joints, reformatting the specific points of estimation models to match the skeleton by converting a coordinate of position produced in estimation models from a 4-dimensional to a 3-dimensional matrix, which is available to be a joint of the avatar; making estimates for missing data to fulfil animation requirement; and recognizing and categorizing facial expressions of real users to make an avatar's facial expressions appear more natural;
    detecting hand or finger positions of the user so as to identify specific gestures as presented by hands or fingers; and a facial expression detection model arranged to identify facial expression as expressed by the user;

detecting one or more facial expressions of the user; and, animating the avatar in the virtual world with the plurality of motion tracking points and the detected one or more facial expressions so as to mirror the actions and facial expressions of the active user, wherein the avatar animation engine includes a physics engine arranged to apply an inverse kinematics function onto the plurality of motion tracking points of seven body portions, including the body, left arm, right arm, left leg, right leg, left-hand fingers and right-hand fingers.

8. A method for animating an avatar in accordance with claim 7, wherein the step of processing the activity data includes:

identify one or more portions of the user, including head, arms, torso, legs or any one or combination thereof from the stream of images;

place tracking points on the identified one or more portions of the user; and, track the movement of the tracking points over the stream of images.

9. A method for animating an avatar in accordance with claim 8, wherein the tracking points are:

mapped onto an avatar skeleton arranged to represent a physical structure of the avatar; and, aligned with the one or more joints of the virtual avatar skeleton.

10. A method for animating an avatar in accordance with claim 7, wherein the step of processing the activity data includes using a hand tracking model arranged to track a hand or finger gesture of the user from the stream of images.

11. A method for animating an avatar in accordance with claim 7, wherein the step of animating the avatar further includes using an anti-clipping engine arranged to apply a collider around the avatar to avoid clipping of the avatar when animated in the virtual world.

12. A method for animating an avatar in accordance with claim 11, wherein the anti-clipping engine is further arranged to include a spring joint function arranged to apply a colliding and opposing force on the plurality of motion tracking points.

\* \* \* \* \*